United States Patent
Paulraj

(10) Patent No.: US 6,931,488 B2
(45) Date of Patent: Aug. 16, 2005

(54) RECONFIGURABLE CACHE FOR APPLICATION-BASED MEMORY CONFIGURATION

(75) Inventor: Dominic Paulraj, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 702 days.

(21) Appl. No.: 10/021,492

(22) Filed: Oct. 30, 2001

(65) Prior Publication Data

US 2003/0084244 A1 May 1, 2003

(51) Int. Cl.$^7$ ............................................... G06F 13/00
(52) U.S. Cl. ..................... 711/118; 711/154; 711/166; 711/170
(58) Field of Search ............................... 711/118, 154, 711/166, 170

(56) References Cited

U.S. PATENT DOCUMENTS

| | | | |
|---|---|---|---|
| 5,937,203 A | 8/1999 | Lee et al. .............. | 395/800.43 |
| 2002/0072893 A1 * | 6/2002 | Wilson ........................ | 703/26 |

FOREIGN PATENT DOCUMENTS

JP 2001-216195 8/2001

OTHER PUBLICATIONS

PCT Notification of Transmittal of The International Search Report or the Declaration dated Jun. 20, 2003 (6 pages).
Patent Abstracts of Japan No. 2001216195, publication date Aug. 10, 2001 (1 page).

\* cited by examiner

Primary Examiner—Reba I. Elmore
(74) Attorney, Agent, or Firm—Osha Liang LLP

(57) ABSTRACT

A computer system includes a cache memory a functional unit in communication with the cache memory, and a reconfiguration module. The functional unit executes applications using the cache memory. The reconfiguration module is for determining an optimal configuration of cache memory for a particular application and programming the cache memory to the optimal configuration. A method of reconfiguring cache memory includes determining an optimal configuration of cache memory for a particular application executed by a functional unit using a cache memory and programming the cache memory to the optimal configuration.

20 Claims, 7 Drawing Sheets

RECONFIGURABLE CACHE FOR APPLICATION-BASED MEMORY CONFIGURATION

BACKGROUND OF INVENTION

Referring to FIG. 1, a typical computer system includes a microprocessor (10) having, among other things, a CPU (12), a memory controller (14), and an on-board cache memory (16). The microprocessor (10) is connected to external cache memory (17) and main memory (18) that holds data and program instructions to be executed by the microprocessor (10). Internally, the execution of program instructions is carried out by the CPU (12). Data needed by the CPU (12) to carry out an instruction are fetched by the memory controller (14). Upon command from the CPU (12), the memory controller (14) searches for the data first in the cache memory (16), next in the external cache (17), and finally in the main memory (18). Finding the data in the cache memory is referred to as a "hit." Not finding the data in the cache memory is referred to as a "miss."

The hit rate depends, in no small part, on the caching scheme or policy employed by the computer system, e.g., direct-mapped, or set associative. Generally, a set associative caching policy provides a higher hit rate than a direct-mapped policy. However, for some computer applications, a direct-mapped policy may provide better system performance due to a better hit rate. This depends on the address sequences used by the application, the allocation of memory pages to an application by the operating system, and whether virtual or physical addresses are used for addressing the cache.

An example of a direct-mapped cache memory is functionally depicted in FIG. 2A. In this example, a portion of the main memory (18) is stored or cached in a cache memory (20) having a tag part (22) and a data part (24). The tag part (22) and the data part (24) may be a single cache memory logically partitioned into two parts, or two actual, physical cache memories. In general, the tag part (22) stores the physical addresses of the locations in main memory being cached, and the data part (24) stores the data residing in those locations. Both the tag part (22) and the data part (24) share a common index that is used to reference the two parts.

In operation, the CPU requests data by issuing to the load/store unit an address which includes an index component and a tag component. The load/store unit then goes to the tag part (22) of the cache (20) and checks the specified index to see if that particular tag entry matches the specified tag. If yes, a hit has occurred, and the data corresponding to the specified index is retrieved and provided to the CPU. If no, then the requested data has to be obtained from main memory. For example, an address having an index component of '0' and a tag component of '32' will result in a hit, and data 'A' will be retrieved and sent to the CPU. However, there can only be one tag entry per index number and, therefore, a subsequent index component of '0' and a tag component of '24' will result in a miss. A set associative policy generally has a higher hit rate per access, as will be explained below.

An example of a set associative cache is functionally depicted in FIG. 2B. As in the previous example, a cache memory (26) is partitioned into a tag part (28) and a data part (30), with both parts sharing a common index. However, instead of a single entry per index, the tag part (28) and the data part (30) each have four entries, best shown here as rows and columns. A row of entries is called a "set" so that there are as many sets as there are index numbers, and a column of entries is called a "way" so that there are four ways for each index number. This particular cache policy, therefore, is commonly referred to as 4-way set associative. Those skilled in the art will appreciate that the set associative policy is commonly, but not limited to, 2-way to 8-way. Herein, examples are presented for 4-way set associativity, but the concepts are equally applicable to n-way set associativity.

In operation, when the load/store unit goes to search the tag part (28) at the specified index number, all four ways are compared to the specified tag component. If one of the four ways matches (a hit occurs), the corresponding way of the corresponding set in the data part (30) is sent to the CPU. Thus, in the previous example, a virtual address having an index component of '0' and tag component of '24' will be a hit because there are four tag entries per index number. If the first tag entry does not match, there are three more chances to find a match per access. Thus, effectively, the 4-way set associative policy allows the CPU to find cached data one of four ways.

More than one CPU may share cache memory. In such situations, each CPU acts as described above and simply searches in the same memory space as the other CPUs. Depending on the programs being executed on the CPUs, different configurations of associativity, cache size, and resource sharing results in differing degrees of performance.

Referring to FIG. 3, a typical CPU (50) is shown having a functional unit (52) and three levels of cache, L1 cache (54), L2 cache (56), and L3 cache (58). When a program (60) is executed on the CPU, an output (62) is generated. In order to determine the optimal configuration of associativity, cache size, and resource sharing, testing is performed on the program (60) to determine the specific workload required. Once specific workload requirements are determined through testing, a configuration of components for optimal performance can be found and a system having the appropriate characteristics can be manufactured.

SUMMARY OF INVENTION

In general, in one aspect, one or more embodiments of the present invention involve a computer system comprising a cache memory, a functional unit in communication with the cache memory, and a reconfiguration module. The functional unit executes applications using the the cache memory. The reconfiguration module is for determining an optimal configuration of the cache memory for a particular application and programming the cache memory to the optimal configuration.

In general, in one aspect, one or more embodiments of the present invention involve a method of reconfiguring cache memory comprising determining an optimal configuration of the chache memory for a particular application executed by a functional unit using the cache memory, and programming the cache memory to the optimal configuration.

In general, in one aspect, one or more embodiments of the present invention involve a computer system comprising means for determining an optimal configuration of cache memory for a particular application executed by a functional unit using the cache memory and means for programming the cache memory to the optimal configuration.

In general, in one aspect, one or more embodiments of the present invention involve a computer system comprising a field-programmable gate array, a functional unit in communication with the field-programmable gate array, and a reconfiguration module. The functional unit executes applications using the field-programmable gate array. The reconfiguration module for determining an optimal configuration of the field-programmable gate array for a particular application and programming the field-programmable gate array to the optimal configuration. The reconfiguration module determines the optimal configuration by collecting performance information and analyzing the collected performance information.

Other aspects and advantages of the invention will be apparent from the following description and the appended claims.

DETAILED DESCRIPTION

Figure 1:
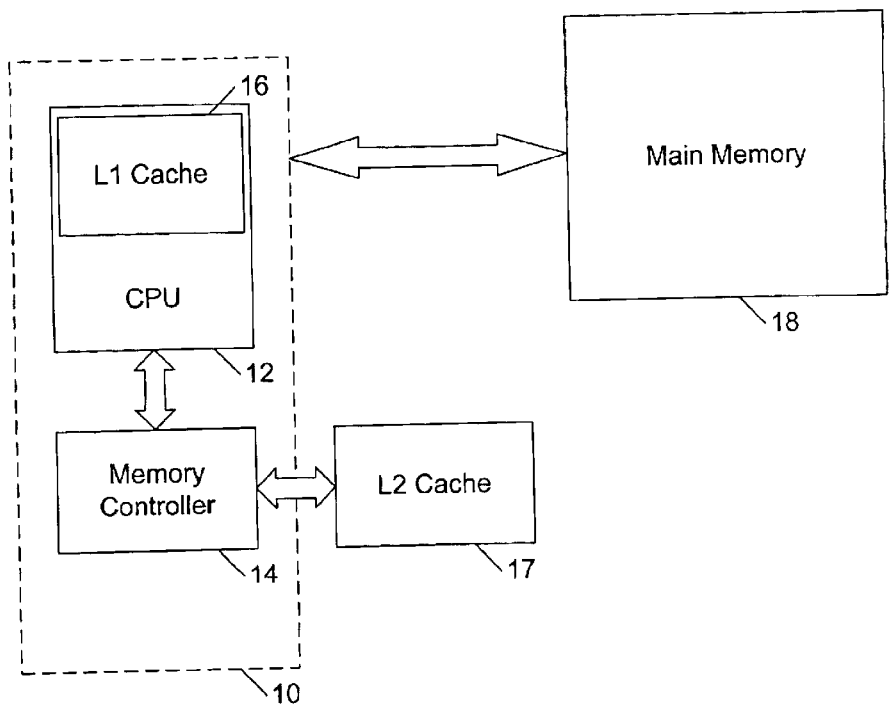
FIG. 1 shows a typical computer system.
Figure 2A:
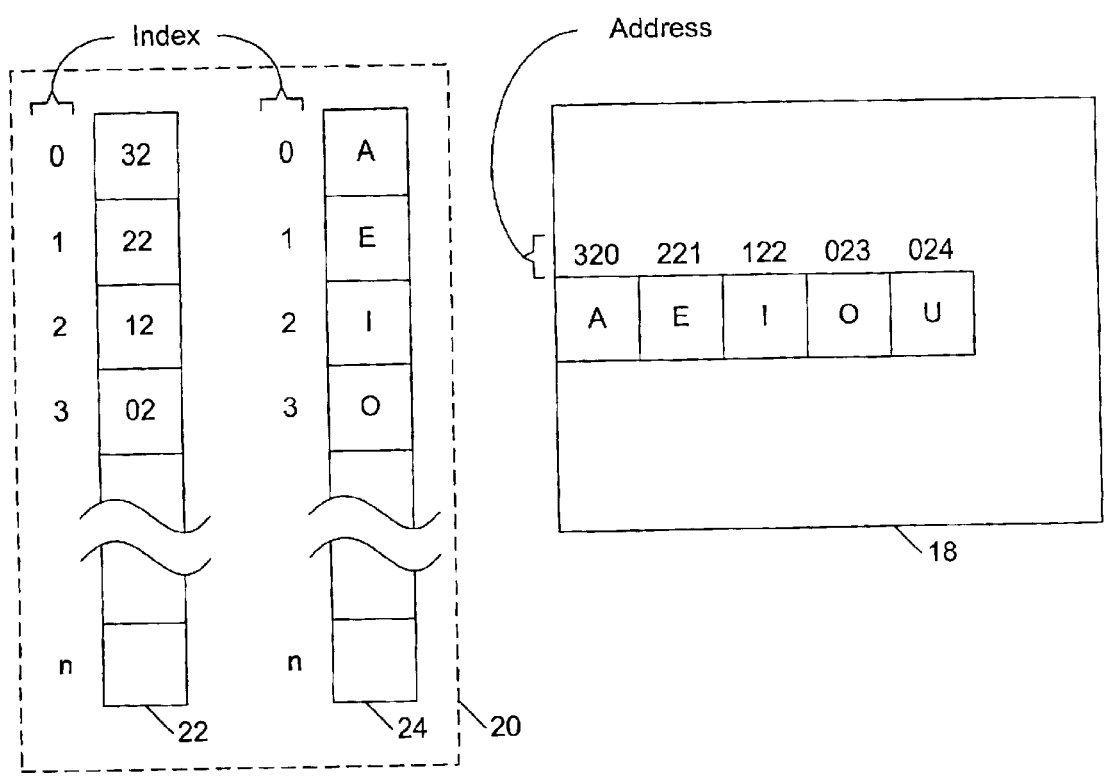
FIG. 2A shows a functional example of a direct-mapped cache memory.
Figure 2B:
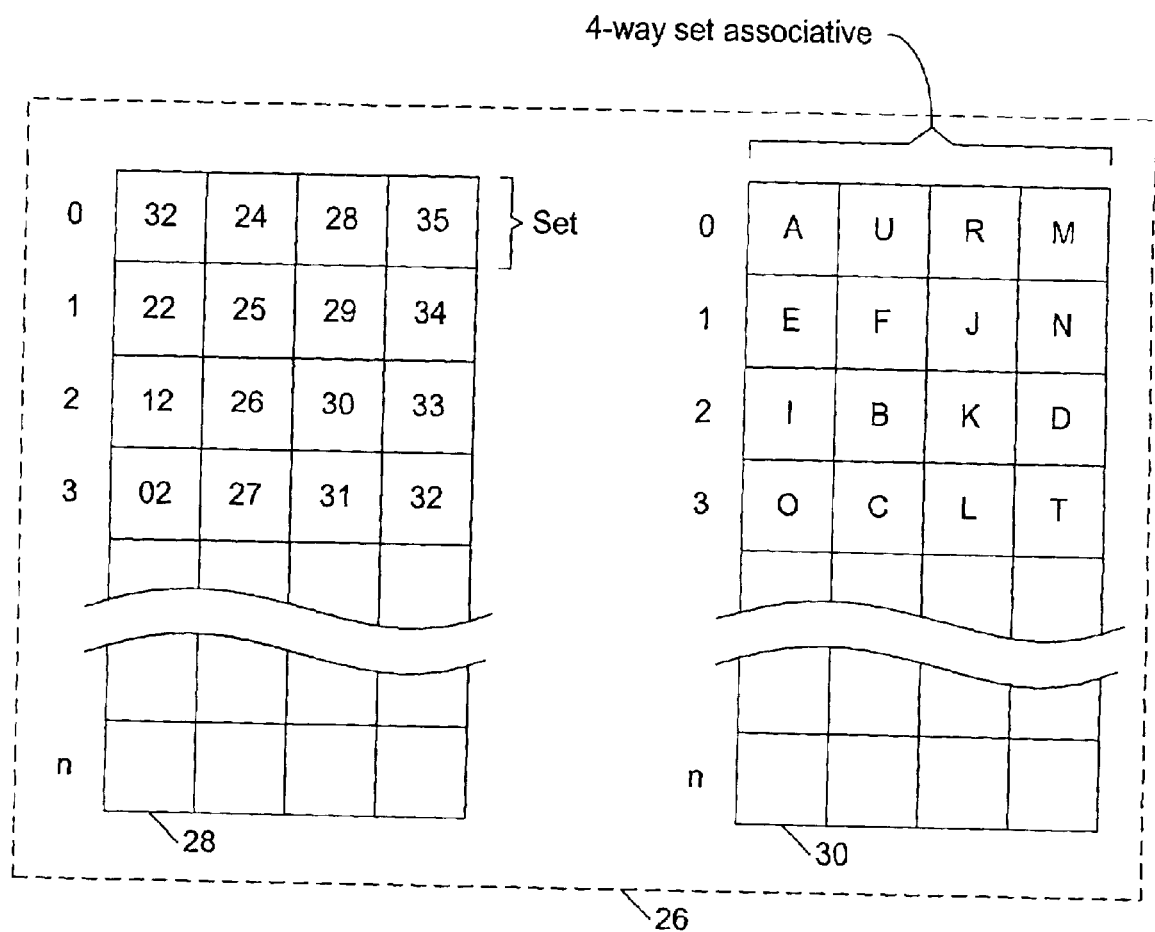
FIG. 2B shows a functional example of a set associative cache.
Figure 3:
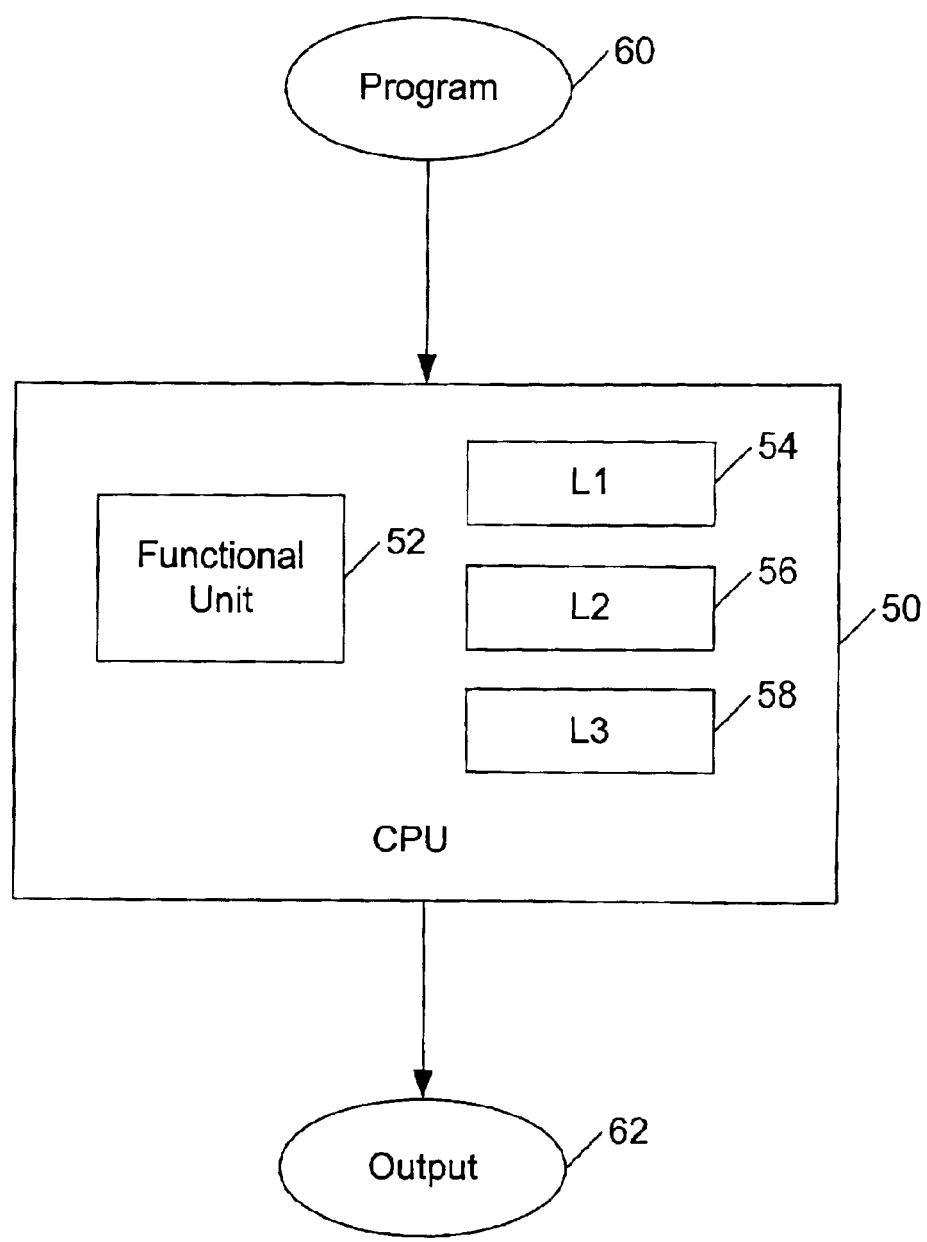
FIG. 3 shows a block diagram of typical program execution on a CPU.
Figure 4:
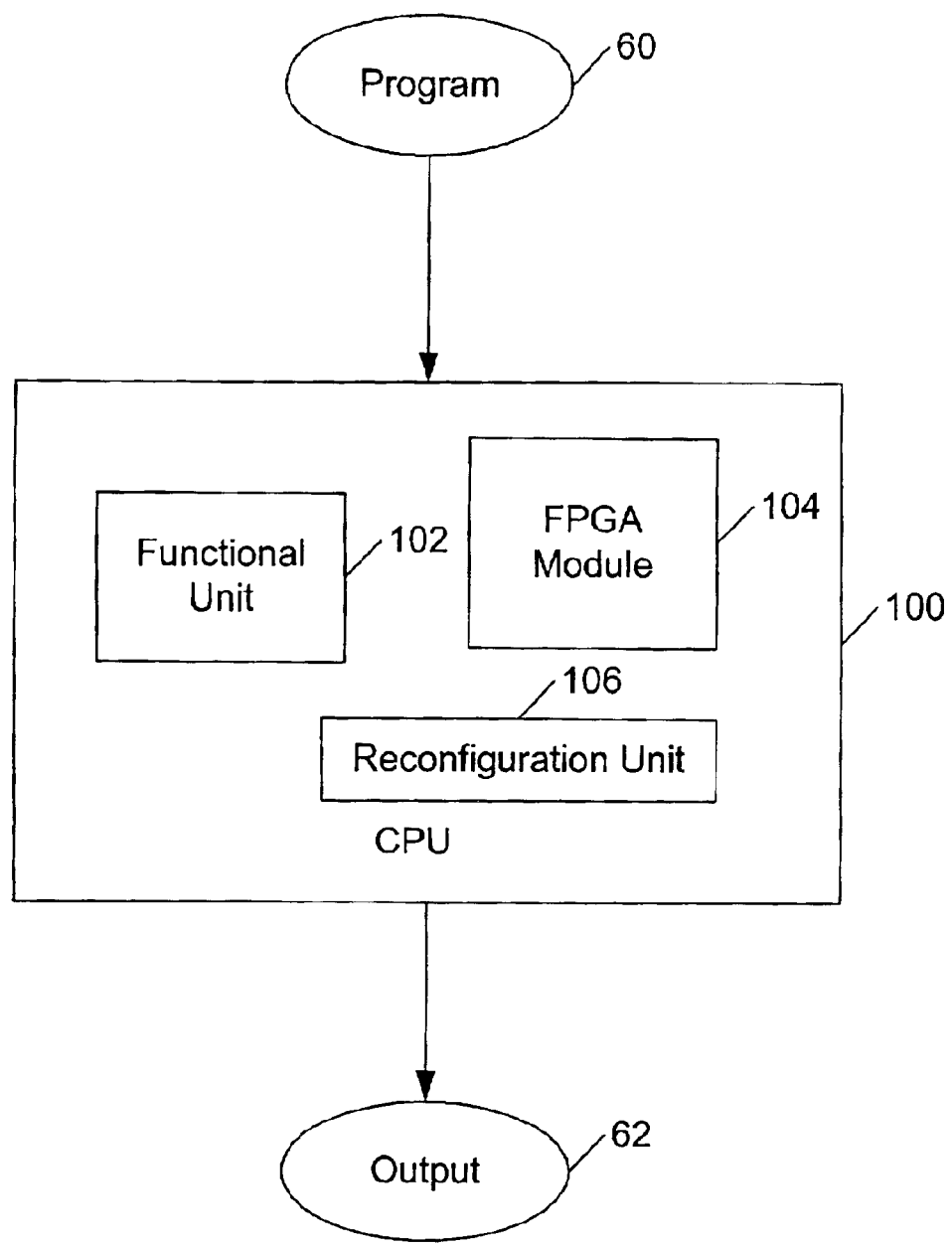
FIG. 4 shows a block diagram of a system in accordance with an embodiment of the present invention.

In one aspect, the present invention involves reconfigurable cache architectures. A processor with reconfigurable cache architecture can be used in a wide range of applications and need only to profile the specific workload requirements desired to reconfigure itself for optimal performance. Referring to FIG. 4, a block diagram of a system in accordance with an embodiment of the present invention is shown.

The system (100) shown has a functional unit (102), a programmable memory unit module (104) such as a field-programmable gate array (FPGA) module, and a reconfiguration unit (106). The reconfiguration unit (106) controls the programmable memory module (104), which serves as the different caches (i.e., 11 cache, 12 cache, and 13 cache) necessary for operation. To set up the configuration of the programmable memory module (104), a vector is supplied from the reconfiguration unit (106).

The vector representing the optimal configuration for a particular application is determined by collecting performance information. Once performance information has been collected for a particular application, software such as execution profiles can be used collect the information on how the application accesses the memory. Using this memory access information, a best cache hierarchy, line size, blocking factor, and associativity can be determined by simulation. Those skilled in the art will appreciate that various methods exist for determining how a program accesses memory and, in turn, determining the optimal memory configuration.

Upon determining an optimal configuration for the application, a configuration vector is created. The configuration vector contains data relating the optimal configuration to the necessary instructions for programming the programmable memory module (104) to perform in the optimal configuration.

The reconfiguration module (106) uses the vector to configure the programmable memory module (104), which is then used by the functional unit (102) to execute the application.

Figure 5:
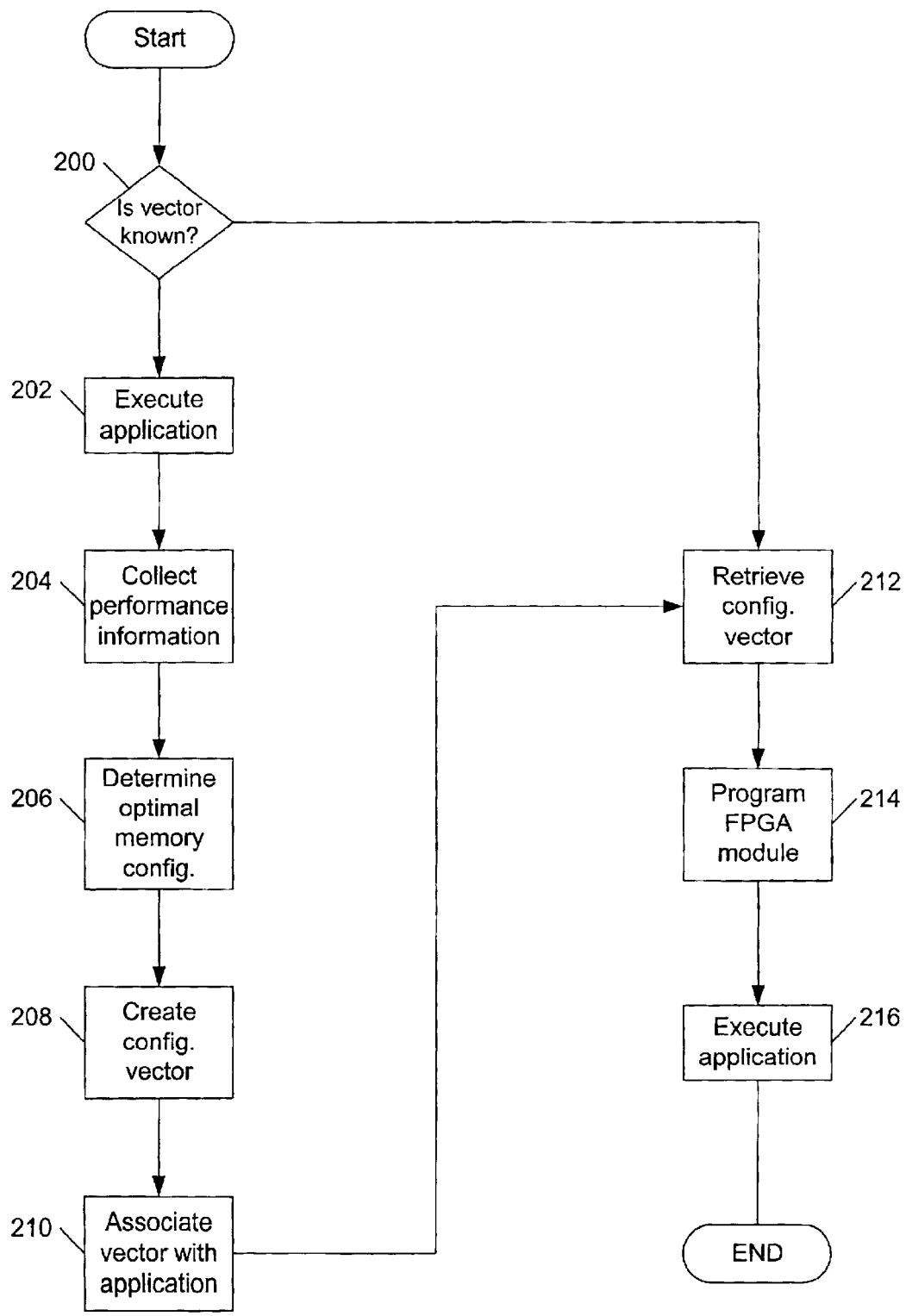
FIG. 5 is a flow chart of a method in accordance with an embodiment of the present invention.

Referring to FIG. 5, a method in accordance with an embodiment of the present invention is shown. First, the system determines whether the configuration vector representing the optimal performance for a particular application is known (step 200). If so, the vector is retrieved (step 212), the programmable memory module (104) is programmed (step 214), and the application is executed with the optimal memory configuration for that application (step 216).

Alternatively, if the vector is not known (step 200), the application is executed to determine how the program accesses memory (step 202). Once, the performance information for the application is collected (step 204), simulations are run to determine the optimal memory configuration for the application (step 206). Next, a vector representing the optimal configuration is created (step 208) and associated with the particular application (step 210). This configuration vector is then retrieved (step 212), used to program the FPGA module (step 214), and the application is executed with the optimal memory configuration for that application (step 216).

Figure 6:
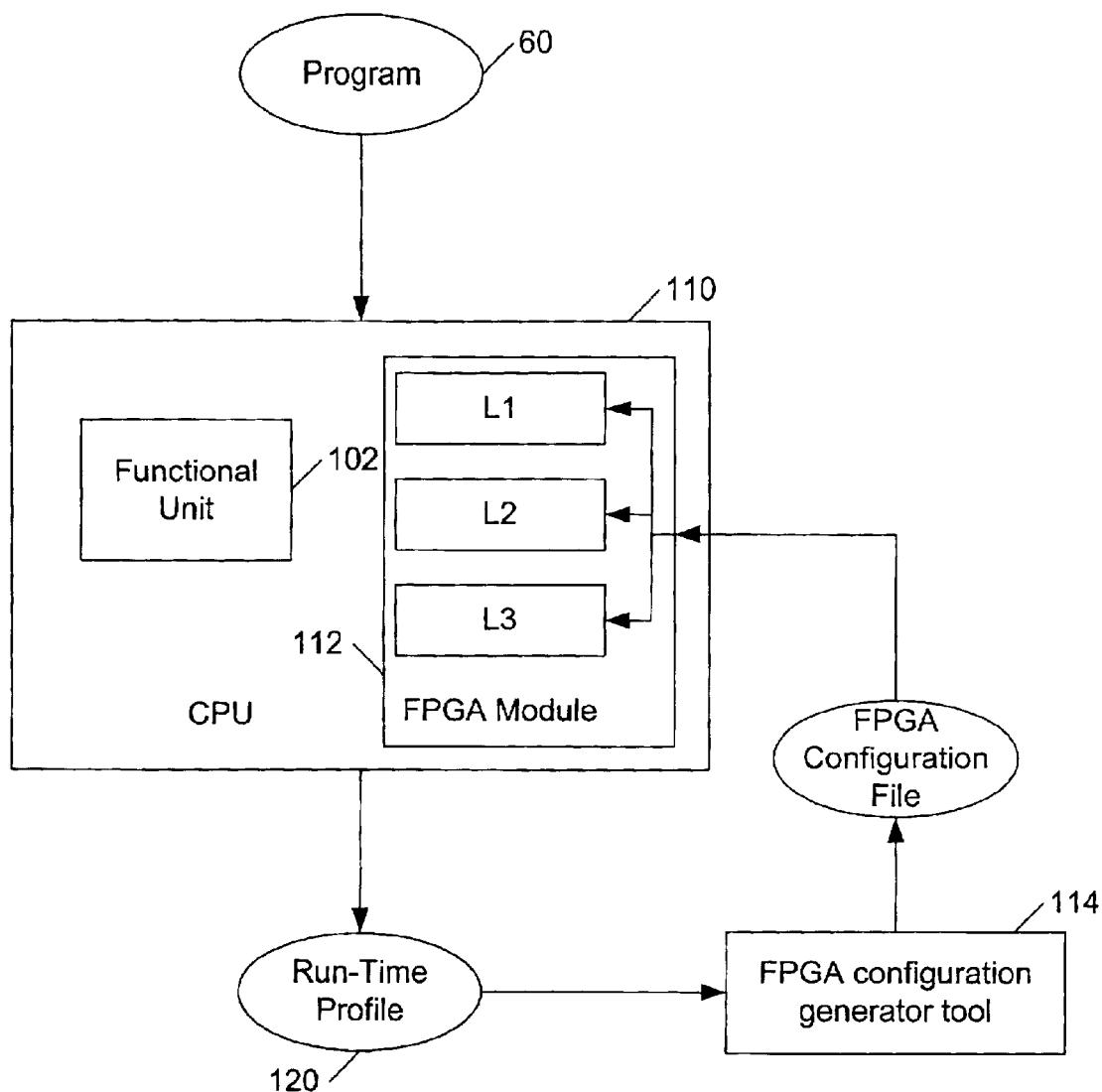
FIG. 6 shows program execution on a system in accordance with an embodiment of the present invention.

Referring to FIG. 6, in one or more embodiments, the reconfiguration unit may be a separate unit. As shown, system (110) includes a functional unit (102) and an FPGA module (112), which will act as three levels of cache memory (L1 cache, L2 cache, L3 cache) for the functional unit (102). An FPGA configuration generator tool (114) is also included. The FPGA configuration generator tool (114) can be used to program the cache hierarchy, line size, blocking factor, and associativity of the FPGA module (112). To determine how the FPGA module (112) should be programmed for optimal performance, first a run-time profile (120) is created for a received program (60). The run-time profile (120) is then used by the FPGA configuration generator tool (114) to create a FPGA configuration file of the optimal configuration for the program (60). The configuration file is then used to program the FPGA module (112) into the optimal configuration for the program (60).

Advantages of the present invention may include one or more of the following. The configuration vector need only be calculated once for an application and then associated with the application. When the application is loaded for execution, the reconfiguration unit (106) extracts the configuration vector for that specific application and sets up the programmable memory module (104) accordingly. Because the cache is configured in the best cache architecture, no other architecture beats its performance. The system can be configured on a per application basis. Only one system needs to be manufactured because the system cache can be reconfigured to process a variety of applications optimally.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system comprising:
   a cache memory;
   a functional unit in communication with the cache memory, wherein the functional unit executes applications using the cache memory; and
   a reconfiguration module for determining an optimal configuration of the cache memory for a particular application and programming the cache memory to the optimal configuration.

2. The computer system of claim 1, wherein the cache memory is a field-programmable gate array.

3. The computer system of claim 1, wherein the reconfiguration module supplies a vector representing the optimal configuration determined to the cache memory.

4. The computer system of claim 1, wherein the reconfiguration module determines the optimal configuration by collecting performance information and analyzing the collected performance information.

5. The computer system of claim 1, wherein the cache memory, the functional unit, and the reconfiguration unit are combined into a single system.

6. The computer system of claim 1, wherein the cache memory is a programmable memory module.

7. A method of reconfiguring cache memory comprising:

determining an optimal configuration of the cache memory for a particular application executed by a functional unit using the cache memory; and programming the cache memory to the optimal configuration.

8. The method of claim 7, wherein the determining of the optimal configuration of the cache memory for a particular application executed by a functional unit using the cache memory comprises:

collecting performance information; and analyzing the collected performance information.

9. The method of claim 7, further comprising:

determining another optimal configuration of the cache memory for another particular application executed by the functional unit using the cache memory; and programming the cache memory to the another optimal configuration.

10. The method of claim 9, further comprising:

dynamically switching between programming the cache memory to the optimal configuration and the another optimal configuration based on which application is being executed by the functional unit.

11. The method of claim 7, wherein the programming of the cache memory comprises:

creating a vector representing the optimal configuration; and sending the vector to the cache memory.

12. The method of claim 11, wherein a field programmable gate array configuration generator tool creates the vector.

13. A computer system comprising:

means for determining an optimal configuration of cache memory for a particular application executed by a functional unit using a cache memory; and means for programming the cache memory to the optimal configuration.

14. The computer system of claim 13, wherein the means for determining the optimal configuration of the cache memory for a particular application executed by a functional unit using a cache memory comprises:

means for collecting and analyzing performance information.

15. The computer system of claim 13, wherein the means for programming the cache memory comprises:

means for creating a vector representing the optimal configuration and sending the vector to the cache memory.

16. The computer system of claim 13, further comprising:

means for determining another optimal configuration of cache memory for another particular application executed by the functional unit using the cache memory; and means for programming the cache memory to the another optimal configuration.

17. The computer system of claim 16, further comprising:

means for dynamically switching between programming the cache memory to the optimal configuration and the another optimal configuration based on which application is being executed by the functional unit.

18. A computer system comprising:

a field-programmable gate array;

a functional unit in communication with the field-programmable gate array, wherein the functional unit executes applications using the field-programmable gate array; and a reconfiguration module for determining an optimal configuration of the field-Programmable gate array for a particular application and programming the field-programmable gate array to the optimal configuration, wherein the reconfiguration module determines the optimal configuration by collecting performance information and analyzing the collected performance information.

19. The computer system of claim 18, wherein the reconfiguration module supplies a vector representing the optimal configuration determined for the field programmable gate array.

20. The computer system of claim 18, wherein the field programmable gate array, the functional unit, and the reconfiguration unit are combined into a single system.

* * * * *